US 11,156,455 B2
Oct. 26, 2021

(12) United States Patent
Thimmegowda et al.

(10) Patent No.: US 11,156,455 B2
(45) Date of Patent: Oct. 26, 2021

(54) SYSTEM AND METHOD FOR MEASURING CLEARANCE GAPS BETWEEN ROTATING AND STATIONARY COMPONENTS OF A TURBOMACHINE

(71) Applicant: General Electric Company, Schenectady, NY (US)

(72) Inventors: Shalini Thimmegowda, Bangalore (IN); K. G. V. Siva Kumar, Bangalore (IN); Bhanu Kishore Battu, Bangalore (IN); Vishwanath Thippeswamy, Bangalore (IN); Richa Awasthi, Bangalore (IN); Srinivasan Swaminathan, Bangalore (IN)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 16/142,425

(22) Filed: Sep. 26, 2018

(65) Prior Publication Data

US 2020/0096329 A1    Mar. 26, 2020

(51) Int. Cl.
   *G01B 15/00*    (2006.01)
   *F01D 19/00*    (2006.01)
   *F01D 25/00*    (2006.01)

(52) U.S. Cl.
   CPC ............. *G01B 15/00* (2013.01); *F01D 19/00* (2013.01); *F01D 25/00* (2013.01); *F05D 2220/32* (2013.01); *F05D 2260/83* (2013.01)

(58) Field of Classification Search
   CPC ...... G01B 15/00; G01B 15/04; G01B 11/026; G01B 7/14; F01D 11/14; F01D 17/02;
   (Continued)

(56) References Cited

U.S. PATENT DOCUMENTS 4,813,273 A    3/1989  Parsons
4,842,477 A    6/1989  Stowell
(Continued)

FOREIGN PATENT DOCUMENTS

CN    101464126 A    6/2009
CN    101982731 A    2/2011
(Continued)

OTHER PUBLICATIONS

Korostynska et al., Proof-of-concept microwave sensor on flexible substrate for real-time water composition analysis, IEEE Xplore, 2012 Sixth International Conference on Sensing Technology (ICST) Dec. 18-21, 2012, pp. 547-550. https://ieeexplore.ieee.org/document/6461739/.
(Continued)

*Primary Examiner* — Courtney D Heinle
*Assistant Examiner* — Danielle M. Christensen
(74) *Attorney, Agent, or Firm* — Fitch, Even, Tabin & Flannery, LLP

(57) ABSTRACT

Systems and methods for measuring the clearance gaps between rotating and stationary components of a turbomachine are provided. In one exemplary aspect, flexible and degradable sensing arrays that include a plurality of microwave sensors are utilized to sense the clearance gaps between rotating and stationary components of the turbomachine. Microwaves generated by a microwave generator are transmitted to the sensors. Upon rotation of the rotating components, the rotating components reflect the microwaves transmitted thereto. The microwave sensors capture the transmitted signal and also capture a reflected signal indicative of the transmitted signal reflected by the rotating components. The signals are then forwarded to a computing device for processing. The amplitude difference at the interference fringes between the superimposed signals is repre-
(Continued)

sentative of the clearance gaps between the rotating and stationary components. After measuring the clearance gaps, the turbomachine may be operated and the degradable sensing array may be consumed.

20 Claims, 10 Drawing Sheets

(58) Field of Classification Search
CPC .... F01D 17/24; F01D 21/003; F05D 2260/80; F05D 2270/80
USPC ............................................................ 415/1
See application file for complete search history.

(56) References Cited

U.S. PATENT DOCUMENTS

| | | | |
|---|---|---|---|
| 5,061,836 | A | 10/1991 | Martin |
| 5,818,242 | A | 10/1998 | Grzybowski et al. |
| 6,717,420 | B2 | 4/2004 | Eyraud et al. |
| 6,828,782 | B2 | 12/2004 | Nagai et al. |
| 7,455,495 | B2 | 11/2008 | Leogrande et al. |
| 8,240,986 | B1 | 8/2012 | Ebert |
| 8,344,741 | B2 | 1/2013 | Sheikman et al. |
| 8,558,538 | B2 | 10/2013 | Phillips et al. |
| 8,593,156 | B2 | 11/2013 | Lee et al. |
| 8,624,603 | B2 | 1/2014 | Lee et al. |
| 8,678,742 | B2 | 3/2014 | Klingels |
| 8,773,115 | B2 | 7/2014 | Phillips et al. |
| 9,068,471 | B2 | 6/2015 | Klingels |
| 9,915,518 | B2 | 3/2018 | Leroux |
| 2002/0167311 | A1 | 11/2002 | Dzieciol et al. |
| 2002/0175669 | A1 | 11/2002 | Ziegner et al. |
| 2006/0140756 | A1 | 6/2006 | Schwarz et al. |
| 2007/0020095 | A1 | 1/2007 | Dierksmeier et al. |
| 2007/0043497 | A1 | 2/2007 | Leogrande et al. |
| 2007/0222459 | A1 | 9/2007 | Andarawis et al. |
| 2009/0044542 | A1 | 2/2009 | Thatcher et al. |
| 2009/0237093 | A1 | 9/2009 | Kim et al. |
| 2010/0077830 | A1 | 4/2010 | Andarawis et al. |
| 2010/0097079 | A1 | 4/2010 | Sheikman et al. |
| 2011/0084171 | A1 | 4/2011 | Lam et al. |
| 2012/0126832 | A1 | 5/2012 | Jensen et al. |
| 2013/0120003 | A1 | 5/2013 | Sheikman et al. |
| 2013/0312249 | A1 | 11/2013 | Buchal et al. |
| 2016/0047269 | A1 | 2/2016 | Zacchera et al. |
| 2017/0159483 | A1 | 6/2017 | Hudson et al. |
| 2018/0106588 | A1 | 4/2018 | Safai et al. |

FOREIGN PATENT DOCUMENTS

| | | |
|---|---|---|
| DE | 19601225 C1 | 6/1997 |
| EP | 1754861 A2 | 2/2007 |
| EP | 1448489 B1 | 8/2010 |
| EP | 2455706 A1 | 5/2012 |
| EP | 2592753 A2 | 5/2013 |
| JP | 3692344 B2 | 9/2005 |
| RU | 2519127 C1 | 6/2014 |

OTHER PUBLICATIONS

Woike, Evaluation of a Microwave Blade Tip Clearance Sensor for Propulsion Health Monitoring, Setting the Standard for Automation, NASA Glenn Research Center, 2013, 20 Pages. https://ntrs.nasa.gov/search.jsp?R=20140000477.

European Search Report Corresponding to Application No. 19199351 dated Feb. 7, 2020.

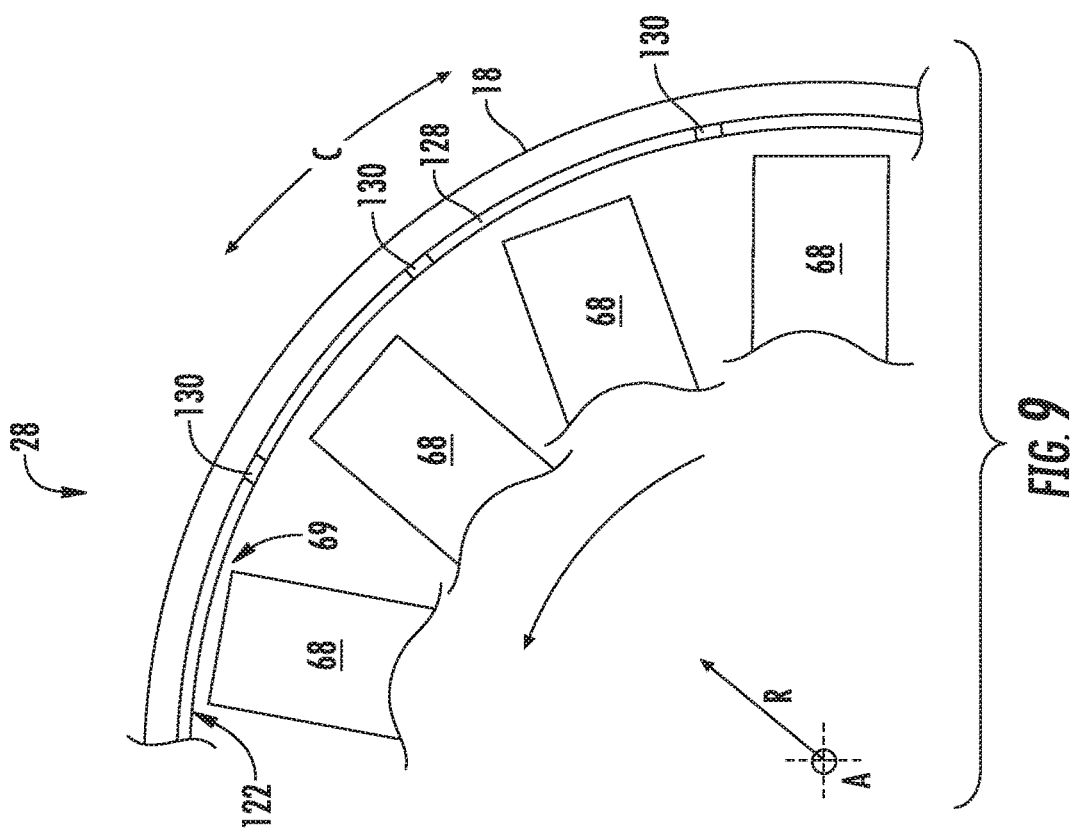
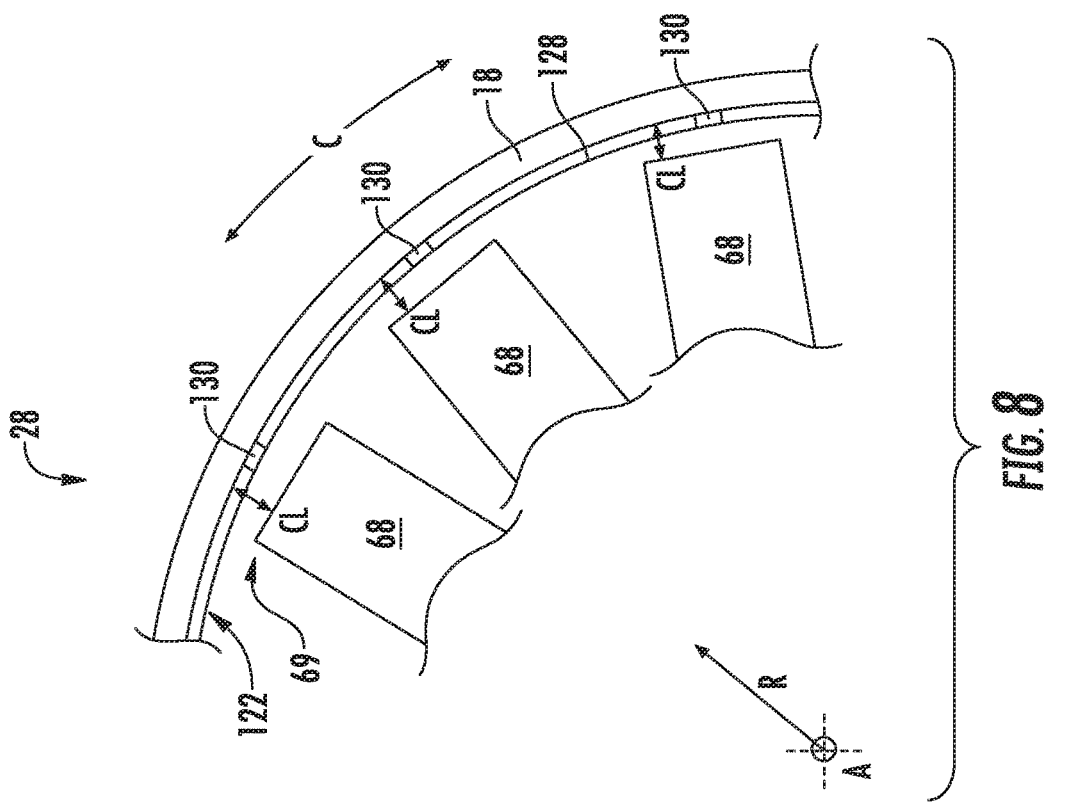

SYSTEM AND METHOD FOR MEASURING CLEARANCE GAPS BETWEEN ROTATING AND STATIONARY COMPONENTS OF A TURBOMACHINE

FIELD

The present subject matter relates generally to turbomachines, and more particularly, to systems and methods for measuring clearance gaps between rotating and stationary components of turbomachines, such as e.g., gas turbine engines.

BACKGROUND

Generally, it is desirable to measure the clearance gaps between rotating and stationary components of a gas turbine engine prior to "firing up" or operating the engine for the first time after assembly. Ensuring the clearance gaps are within specification may confirm that the engine was assembled correctly and that the rotating components have enough clearance to rotate relative to their associated stationary components. As one example, it may be desirable to measure the clearance gap between the tips of rotating blades and a casing or shroud spaced radially outward of the blade tips.

Conventional methods for measuring clearance gaps have a number of drawbacks. For instance, in one conventional method for measuring the clearance gaps between rotating and stationary components, a needle instrument is placed at a tip of a rotating component, such as a turbine blade. The needle instrument creates a potential difference between the instrument and the stationary casing. The blades are then rotated about an axis of rotation and clearance gap measurements are calculated based on the potential difference readings. Notably, one or more wires may be attached to the needle instrument. When the blades are rotated, the wires may become tangled or may catch on objects within the engine, which may damage the wires. Moreover, loading and removing the wires and needle instruments into and from the engine may be difficult. There are also limitations to the type of instruments and wires that may be used as such instruments and wires are typically inserted into the engine through borescope holes. Furthermore, if the wires or instruments break or get stuck in the engine during or after the measurement process, the engine typically must be disassembled to remove the wires and/or instruments and then must be reassembled. Thereafter, the clearances of the reassembled engine must once again be measured. Thus, as noted above, conventional methods of measuring clearance gaps of turbine engines may be time consuming, labor intensive, and costly.

In addition, as conventional methods for measuring clearance gaps may be time consuming to complete, only the clearance gaps between select rotating components and stationary components are typically measured. Moreover, only the clearance gaps between rotating and stationary components of select stages are measured. In addition, as needle instruments only measure a point along the rotating blade, clearance anomalous or deviations along the chord length of the blades typically go undetected.

Accordingly, an improved system and method for measuring the clearance gaps between rotating and stationary components of a turbomachine would be useful.

BRIEF DESCRIPTION

Systems and methods for measuring the clearance between rotating and stationary components of a turbomachine are provided. Aspects and advantages of the invention will be set forth in part in the following description, or may be obvious from the description, or may be learned through practice of the invention.

In one aspect, the present subject matter is directed to a system. The system includes a turbomachine comprising a rotating component rotatable about an axis of rotation and a stationary component spaced from the rotating component by a clearance gap. The system also includes a sensor attached to one of the stationary component and the rotating component. Further, the system includes an electromagnetic wave generator in electrical communication with the sensor and configured to generate electromagnetic waves. The system also includes a computing device communicatively coupled with the sensor. The computing device is configured to: receive a transmitted signal from the sensor, wherein the transmitted signal is representative of the electromagnetic waves received by the sensor; receive, as the rotating component is rotated about the axis of rotation, a reflected signal from the sensor, wherein the reflected signal is representative of the electromagnetic waves reflected by the rotating component; determine a delta between an amplitude of the transmitted signal and an amplitude of the reflected signal of the transmitted signal and the reflected signal; and output a clearance gap measurement indicative of the clearance gap between the rotating component and the stationary component based at least in part on the delta.

In another aspect, the present subject matter is directed to a method for measuring a clearance gap between a rotating component and a stationary component of a turbomachine. The method includes transmitting electromagnetic waves generated by an electromagnetic wave generator to a sensor of a sensing array attached to one of the stationary component and the rotating component. The method also includes rotating the rotating component about an axis of rotation. Further, the method includes receiving, by one or more computing devices: i) a transmitted signal representative of the electromagnetic waves received by the sensor; and ii) a reflected signal representative of the electromagnetic waves reflected by the rotating component as the rotating component is rotated about the axis of rotation. The method also includes determining, by the one or more computing devices, a delta between an amplitude of the transmitted signal and an amplitude of the reflected signal at an interference fringe of the transmitted signal and the reflected signal. Moreover, the method includes outputting a clearance gap measurement indicative of the clearance gap between the rotating component and the stationary component based at least in part on the delta.

In yet another aspect, the present subject matter is directed to a system. The system includes a turbine engine comprising an array of rotating blades rotatable about an axis of rotation and one or more stationary components radially spaced from the rotating blades of the array, wherein each of the rotating blades is spaced from the one or more stationary components by a clearance gap. Further, the system includes a sensing array attached to the one or more stationary components, the sensing array comprising a flexible circuit extending circumferentially along the one or more stationary components and a plurality of sensors electrically coupled by the flexible circuit and spaced circumferentially from one another, wherein the sensing array is formed of a flexible and degradable material. The system also includes a microwave generator in electrical communication with the sensing array. The system further includes a computing device communicatively coupled with the sensing array. The computing device is configured to: activate the microwave generator to generate microwaves, wherein the plurality of sensors receive the microwaves; receive a transmitted signal from each of the plurality of sensors, wherein the transmitted signal received from each of the plurality of sensors is representative of the microwaves received by the plurality of sensors; receive, as the rotating blades are rotated about the axis of rotation, a reflected signal from each of the plurality of sensors, wherein the reflected signal received from each of the plurality of sensors is representative of the microwaves reflected by the rotating components as the rotating components are rotated about the axis of rotation; compare the transmitted signal and the reflected signal associated with the transmitted signal for each of the plurality of sensors based at least in part on one or more signal differentiators; and output a clearance gap measurement for each of the clearance gaps between the rotating blades and the one or more stationary components based at least in part on the comparison between the transmitted signal and the reflected signal associated with the transmitted signal for each of the plurality of sensors based on the one or more signal differentiators.

In a further aspect, the present subject matter is directed to a gas turbine engine defining an axis of rotation. The gas turbine engine includes a stationary component. The gas turbine engine also includes a rotating component rotatable about the axis of rotation and spaced from the stationary component by a clearance gap. Moreover, the gas turbine engine includes a sensor formed of a degradable material attached to one of the stationary component and the rotating component, the sensor operable to generate an output indicative of a clearance gap measurement of the clearance gap between the stationary component and the rotating component.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 provides an axial schematic view of the turbine of FIG. 2 depicting a sensing array positioned therein and rotating blades positioned at a first rotation position;

FIG. 9 provides another axial schematic view of the turbine of FIG. 2 depicting the sensing array positioned therein and rotating blades positioned at a second rotation position;

DETAILED DESCRIPTION

Figure 1:
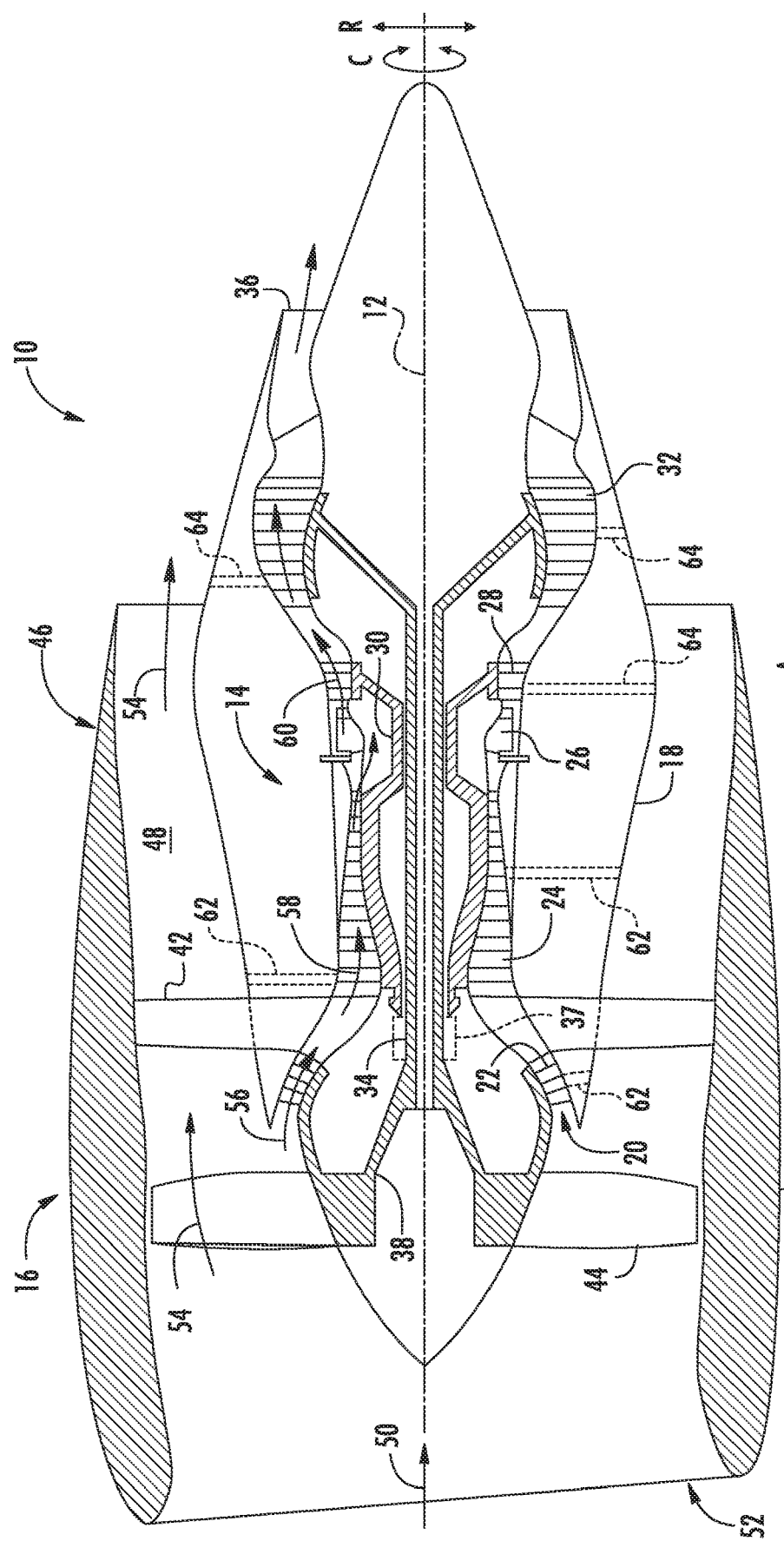
FIG. 1 provides a cross-sectional view of one embodiment of a gas turbine engine that may be utilized within an aircraft in accordance with exemplary aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to improved systems and methods for measuring the clearance gaps between rotating and stationary components of a turbomachine, e.g., a gas turbine engine. In one exemplary aspect, the system includes a turbomachine that has a rotating component and an associated stationary component spaced from the rotating component by a clearance gap. For instance, the rotating component may be a rotating blade and the stationary component may be a casing of the engine. The system also includes a flexible and degradable sensing array that attaches to the stationary component. The sensing array includes a sensor configured to sense the clearance gap between the rotating and stationary component of the turbomachine. The system also includes an electromagnetic wave generator that generates electromagnetic waves, such as microwaves. The electromagnetic wave generator is in electrical communication with the sensing array. To measure the clearance gaps between the rotating and stationary component, electromagnetic waves are fed or transmitted to the sensing array, and more particularly, to the sensors of the sensing array. The rotating components are rotated about an axis of rotation, and as this occurs, the rotating components reflect the electromagnetic waves transmitted to the sensor. The sensor captures the transmitted signal and also captures a reflected signal indicative of the transmitted signal reflected by the rotating component. The signals are then forwarded to a computing device for processing. The amplitude difference at an interference fringe of the superimposed signals is representative of the clearance gap between the rotating and stationary components. After measuring the clearance gap, the electromagnetic wave generator is electrically disconnected from the sensing array and the turbomachine may be "fired up" or operated. Upon firing up the engine, the degradable sensing array is consumed.

FIG. 1 provides a cross-sectional view of one embodiment of a gas turbine engine 10 that may be utilized with an aircraft in accordance with aspects of the present subject matter. The engine 10 is shown having a longitudinal or axial centerline axis 12 extending therethrough for reference purposes. Further, the engine 10 defines an axial direction A, a radial direction R, and a circumferential direction C extending around the axial direction A.

The engine 10 includes a core gas turbine engine 14 and a fan section 16 positioned upstream thereof. The core engine 14 includes a substantially tubular outer casing 18 that defines an annular core inlet 20. In addition, the outer casing 18 encloses and supports a low pressure or booster compressor 22 for increasing the pressure of the air that enters the core engine 14 to a first pressure level. A high pressure, multi-stage, axial-flow compressor 24 receives the pressurized air from the booster compressor 22 and further increases the pressure of such air. The pressurized air exiting the high-pressure compressor 24 flows to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products are expelled from the core engine 14 via an exhaust nozzle 36 to provide propulsive jet thrust.

It should be appreciated that each compressor 22, 24 may include a plurality of compressor stages, with each stage including both an annular array of stationary compressor vanes and an annular array of rotating compressor blades positioned immediately downstream of the compressor vanes. Similarly, each turbine 28, 32 may include a plurality of turbine stages, with each stage including both an annular array of stationary nozzle vanes and an annular array of rotating turbine blades positioned immediately downstream of the nozzle vanes.

Additionally, as shown in FIG. 1, the fan section 16 of the engine 10 includes a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially extending, circumferentially spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, an initial air flow (indicated by arrow 50) may enter the engine 10 through an associated inlet 52 of the fan casing 40. The air flow 50 then passes through or across the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

As further shown in FIG. 1, the gas turbine engine 10 includes a plurality of access ports defined through its casings and/or frames for providing access to the interior of the core engine 14. For this embodiment, the engine 10 includes a plurality of access ports 62 (only three of which are shown) defined through the outer casing 18 for providing internal access to one or both of the compressors 22, 24. Similarly, the engine 10 includes a plurality of access ports 64 (only three of which are shown) defined through the outer casing 18 for providing internal access to one or both of the turbines 28, 32. In several embodiments, the access ports 62, 64 may be spaced apart axially along the core engine 14. For instance, the compressor access ports 62 may be spaced apart axially along each compressor 22, 24 such that at least one access port 62 is located at each compressor stage for providing access to the compressor vanes and blades located within such stage. Similarly, the turbine access ports 64 may be spaced apart axially along each turbine 28, 32 such that at least one access port 64 is located at each turbine stage for providing access to the nozzle vanes and turbine blades located within such stage.

It should be appreciated that, although the access ports 62, 64 are generally described herein with reference to providing internal access to one or both of the compressors 22, 24 and/or for providing internal access to one or both of the turbines 28, 32, the gas turbine engine 10 may include access ports providing access to any suitable internal location of the engine 10, such as by including access ports that provide access within the combustor 26 and/or any other suitable component of the engine 10.

Figure 2:
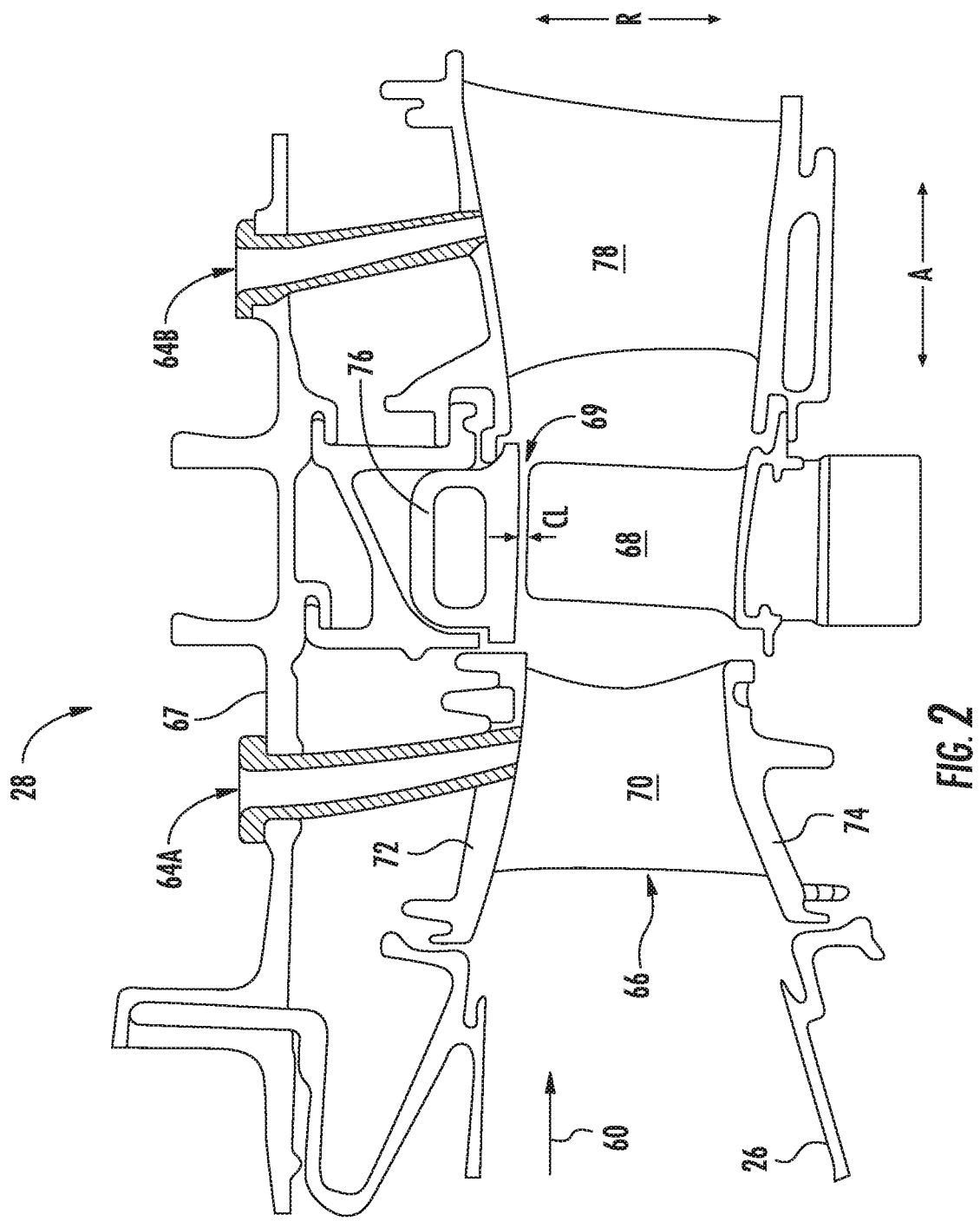
FIG. 2 provides a cross-sectional view of one embodiment of a turbine suitable for use within the gas turbine engine of FIG. 1 depicting access ports defined in the engine for providing internal access to the turbine.

FIG. 2 provides a partial, cross-sectional view of the first (or high pressure) turbine 28 of FIG. 1. As shown, the first turbine 28 includes a first stage turbine nozzle 66 and an annular array of rotating components, which are rotating turbine blades 68 (one of which is shown) in the depicted embodiment. The turbine blades 68 are located immediately downstream of the nozzle 66. The nozzle 66 may generally define an annular flow channel that includes a plurality of radially extending, circularly spaced nozzle vanes 70 (one of which is shown) extending therethrough. The vanes 70 are supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the engine 10. Moreover, a stationary component, or in this embodiment a turbine shroud 76, may be positioned immediately adjacent to the radially outer blade tips 69 of the turbine blades 68 so as to define the outer radial flowpath boundary for the combustion products 60 flowing through the turbine 28 along the hot gas path of the engine 10. A radial or clearance gap CL is defined between the blade tips 69 of the blades 68 and the turbine shroud 76. It is generally desirable to minimize the clearance gap CL between the blade tips 69 and the turbine shrouds 76.

As indicated above, the turbine 28 may generally include any number of turbine stages, with each stage including an annular array of nozzle vanes and downstream turbine blades. For example, as shown in FIG. 2, an annular array of nozzle vanes 78 of a second stage of the turbine 28 may be located immediately downstream of the turbine blades 68 of the first stage of the turbine 28. In some embodiments, although not depicted, an array of turbine blades may be located immediately downstream of the nozzle vanes 78.

Moreover, as shown in FIG. 2, a plurality of access ports 64 are defined through a frame or turbine casing 67, with each access port 64 being configured to provide access to the interior of the turbine 28 at a different axial location. Specifically, as indicated above, the access ports 64 may, in several embodiments, be spaced apart axially such that each access port 64 is aligned with or otherwise provides interior access to a different stage of the turbine 28. For instance, as shown in FIG. 2, a first access port 64A may be defined through the turbine casing 67 to provide access to the first stage of the turbine 28 while a second access port 64B may be defined through the turbine casing 67 to provide access to the second stage of the turbine 28. It should be appreciated that similar access ports 64 may also be provided for any other stages of the turbine 28 and/or for any turbine stages of the second (or low pressure) turbine 32. It should also be appreciated that, in addition to the axially spaced access ports 64 shown in FIG. 2, access ports may be also provided at differing circumferentially spaced locations. For instance, in some embodiments, a plurality of circumferentially spaced access ports may be defined through the turbine casing 67 at each turbine stage to provide interior access to the turbine 28 at multiple circumferential locations around the turbine stage.

Figure 3:
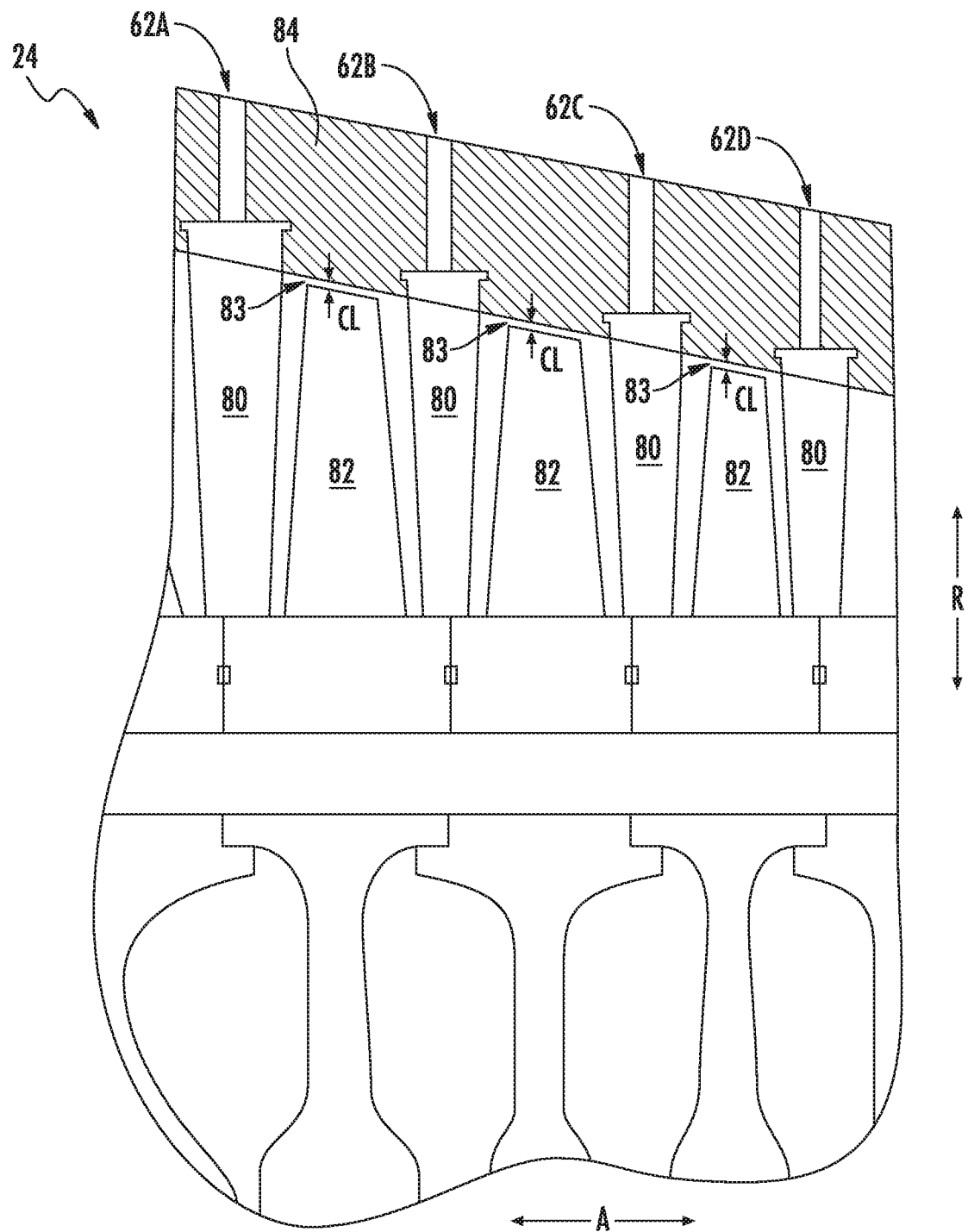
FIG. 3 provides a partial, cross-sectional view of one embodiment of a compressor suitable for use within the gas turbine engine shown in FIG. 1, particularly illustrating access ports defined in the engine for providing internal access to the compressor.

FIG. 3 provides a partial, cross-sectional view of the high pressure compressor 24 of FIG. 1. As shown, the compressor 24 includes a plurality of compressor stages, with each stage including both an annular array of fixed compressor vanes 80 (only one of which is shown for each stage) and an annular array of rotating components, which are compressor blades 82 (only one of which is shown for each stage) in this embodiment. Each row of compressor vanes 80 is generally configured to direct air flowing through the compressor 24 to the row of compressor blades 82 immediately downstream thereof. A radial or clearance gap CL is defined between the blade tips 83 of the blades 82 and the stationary component(s), or compressor casings 84 in this embodiment.

Moreover, as indicated above, the compressor 24 may include a plurality of access ports 62 defined through the compressor casing/frame 84, with each access port 62 being configured to provide access to the interior of the compressor 24 at a different axial location. Specifically, in several embodiments, the access ports 62 may be spaced apart axially such that each access port 62 is aligned with or otherwise provides interior access to a different stage of the compressor 24. For instance, as shown in FIG. 3, first, second, third and fourth access ports 62A, 62B, 62C, 62D are illustrated that provide access to four successive stages, respectively, of the compressor 24. It should be appreciated that similar access ports may also be provided for any of the other stages of the compressor 24 and/or for any of the stages of the low pressure compressor 22. It should also be appreciated that, in addition to the axially spaced access ports 62 shown in FIG. 3, access ports may be also provided at differing circumferentially spaced locations. For instance, in one embodiment, a plurality of circumferentially spaced access ports may be defined through the compressor casing/frame at each compressor stage to provide interior access to the compressor 24 at multiple circumferential locations around the compressor stage.

Figure 4:
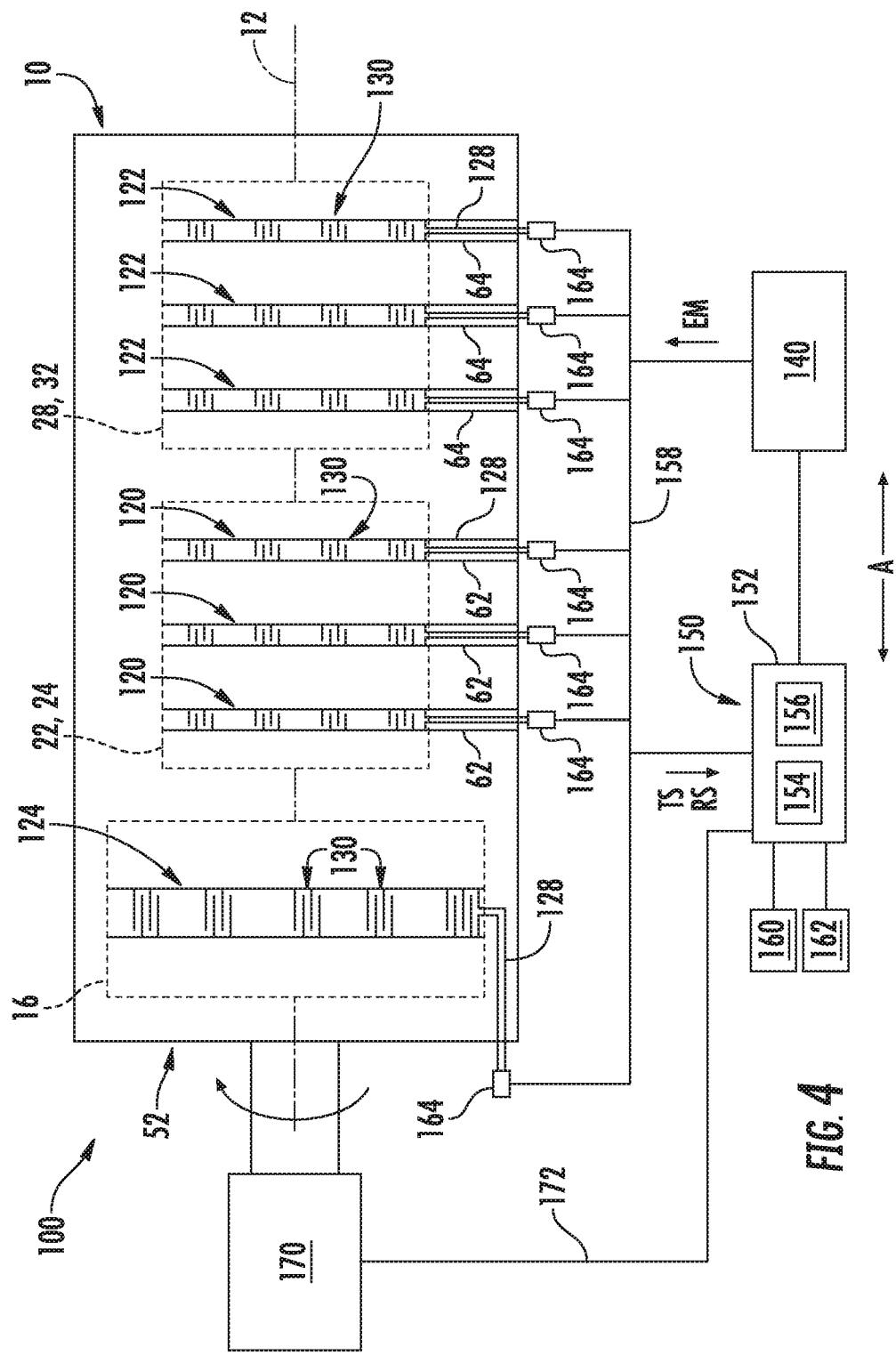
FIG. 4 provides a schematic view of an exemplary system for measuring clearances between rotatory and stationary components of a gas turbine engine.

FIG. 4 provides a schematic view of an exemplary system 100 for measuring clearance gaps between rotating and stationary components of a turbomachine in accordance with exemplary embodiments of the present subject matter. For instance, the system 100 may be utilized to measure the clearance gaps CL between the rotating blades 68 and the stationary turbine shrouds 76 of FIG. 2 or between the rotating blades 82 and the stationary compressor casing 84 of FIG. 3. Alternatively, the system 100 may be utilized to measure the clearance gaps between the rotating blades 68 and the turbine casing 67 or even the clearance gaps between the rotating blades 68 and the outer casing 18 (FIG. 1) of the gas turbine engine 10. The system 100 may also be used to measure the clearance gap between other rotating and stationary components of a turbine engine, e.g., the fan blades 44 and the fan casing 40 (FIG. 1). Further, the system 100 may be utilized to measure the clearance gap or gaps between rotating and stationary components of other turbomachines. As one example, the system 100 may be used to measure the clearance gaps between rotating vanes of an impeller and a stationary casing of a pump.

In one exemplary aspect, the system 100 may be used to measure the "cold" clearance gaps between rotating and stationary components of a turbine engine. For instance, the system 100 may be used to measure the clearance gaps during or at the completion of assembly of the engine but before the engine is "fired-up" or operated for the first time after assembly. In another aspect, the system 100 may be utilized to measure the clearance gaps between rotating and stationary components during servicing or maintenance of the engine, e.g., after disassembly and reassembly of the engine. The system 100 may have other suitable applications as well.

As shown in FIG. 4, the system 100 includes a turbomachine. For this embodiment, the turbomachine is the gas turbine engine 10 of FIG. 1. However, in other embodiments, the system 100 may include other suitable turbomachines that include at least one rotating component that rotates relative to a stationary component. The gas turbine engine 10 includes a rotating component rotatable about an axis of rotation and a stationary component spaced from the rotating component by a clearance gap. For instance, the rotating component rotatable about an axis of rotation may be one of the blades 68 of the turbine 28 of FIG. 2 and the axis of rotation may be the centerline axis 12 (FIG. 1). The stationary component may be the turbine shroud 76, the turbine casing 67, or the outer casing 18 (FIG. 1), for example. The rotating component is spaced from the stationary component by a clearance gap.

The system 100 also includes one or more sensing arrays. The sensing arrays may be axially spaced from one another and may correspond to or be associated with a particular stage of the gas turbine engine 10. For instance, as shown in FIG. 4, a number of stages of the LP and HP compressors 22, 24 have an associated sensing array 120 and a number of stages of the HP and LP turbines 28, 32 have an associated sensing array 122. Further, the fan section 16 also has an associated sensing array 124. In some embodiments, each stage of the LP and HP compressors 22, 24 have an associated sensing array 120. In some embodiments, each stage of the HP and LP turbines 28, 32 have an associated sensing array 122. In some embodiments, only some of the stages of the compressors 22, 24 and/or turbines 28, 32 may include sensing arrays. Further, in some embodiments, the fan section 16 need not include a sensing array. Accordingly, clearance gap measurements may be measured for any desired stage of the gas turbine engine 10.

Figure 5:
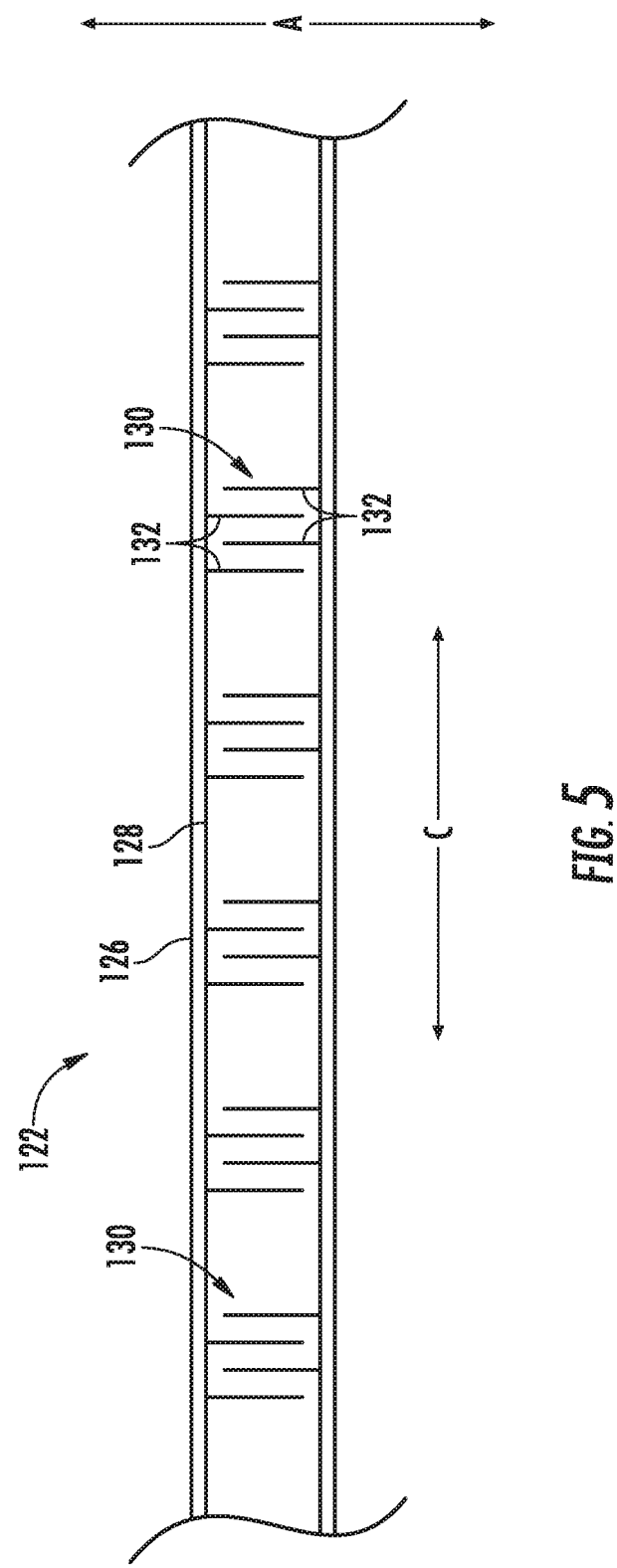
FIG. 5 provides a close up view of a section of one exemplary sensing array in accordance with exemplary aspects of the present subject matter.

FIG. 5 provides a close up view of a portion of one exemplary sensing array. Particularly, FIG. 5 depicts a portion of one of the sensing arrays 122 of FIG. 4. Sensing arrays 120 and 124 (FIG. 4) may be configured in a similar manner as the sensing array 122 of FIG. 5. As shown, the sensing array 122 includes a circuit 128 printed onto a flexible substrate 126. The circuit 128 may be formed of a suitable electrically conducting material, such as e.g., metal or graphene. The flexible substrate 126 may be formed of a suitable flexible material, such as e.g., paper, a polymer film, or other organic films. In this way, the sensing array 122 may be attached (e.g., by a suitable adhesive) to a stationary component having a planar or non-planar surface, such as an arcuate or curved surface. Although not shown, the sensing array 122 may also include a grounding layer attached to the flexible substrate 126. The grounding layer may be the portion of the sensing array 122 that attaches to the stationary component, for example. The grounding layer may be formed of suitable electrically grounding materials, such as e.g., metal or graphene.

The circuit 128 electrically connects a plurality of sensors 130. As shown, the sensors 130 are spaced apart from one another along the circumferential direction C. Each sensor 130 includes a plurality of digits 132 that are interdigitated and spaced from one another along the circumferential direction C. Like the printed circuit 128, the digits 132 of the sensors 130 printed into the flexible substrate 126 may be formed of a suitable electrically conducting material, such as e.g., metal or graphene. In some embodiments, the sensors 130 may be microwave sensors. In other embodiments, more generally, the sensors 130 may be electromagnetic sensors.

As shown best in FIG. 4, the sensors 130 of the sensing arrays 120, 122, 124 are generally configured to receive and transmit electromagnetic waves or signals. For instance, the sensors 130 may receive one or more electromagnetic waves EM (e.g., microwaves) from an electromagnetic wave generator 140 (e.g., a microwave generator) positioned outside of or external to the gas turbine engine 10. The sensors 130 may also transmit or otherwise communicate various signals to one or more computing devices 152 of a computing system 150 of the system 100, such as e.g., a transmitted signal TS and a reflected signal RS as will be explained in greater detail below. Upon receiving the transmitted and reflected signals TS, RS, the one or more computing devices 152 may compare the signals. For instance, the computing devices 152 may compare the transmitted signal TS and the reflected signal RS associated with the transmitted signal TS for each of the plurality of sensors 130 based at least in part on one or more signal differentiators. For instance, the signal differentiator may be one or more of a frequency change, an attenuation, a reflection of the transmitted signal, and a phase shift between the transmitted signal TS and the reflected signal RS.

Thereafter, as will be explained in greater detail herein, the one or more computing devices 152 are configured to output a clearance gap measurement for each of the clearance gaps between the rotating components and the associated stationary components based at least in part on a comparison between the transmitted signal TS and the reflected signal RS associated with the transmitted signal TS for each of the plurality of sensors 130. The signals may be compared based on the one or more signal differentiators, and accordingly, the output is based on the comparison of the one or more signal differentiators. As one example, a reflection of the transmitted signal TS, represented by the reflected signal RS, may be used to determine the output. For instance, the amplitude of the TS signal can be compared to the reflected signal RS at a constructive interference of the two signals. The delta between the amplitudes of the two signals at the constructive interference may be representative of the clearance gap between the rotating and stationary components. The computing devices 152 may output a clearance gap measurement indicative of the clearance gap between the rotating component and the stationary component based at least in part on the delta. In some embodiments, the outputs indicative of the clearance gap measurements for one or more stages of the gas turbine engine 10 may be used to render a clearance gap map or profile of the gas turbine engine 10. The profile may include the clearance gap measurements for each stage of the LP and HP compressors 22, 24, the HP and LP turbines 28, 32, as well as the fan section 16 in which sensing arrays are positioned.

Notably, some or all of the sensing arrays 120, 122, 124, particularly the sensing arrays 122 within the hot section of the engine 10, may be formed of a degradable material or materials. In this manner, as will be explained in greater detail below, when the gas turbine engine 10 is "fired up" or operated, e.g., during an initial test run, the sensing arrays "burn out" or are consumed by the combustion gases. In some embodiments, the sensing arrays formed of degradable material are consumed without leaving an undesirable residue in the gas turbine engine 10. For instance, the degradable material of the sensing arrays may burn out as carbon soot. Accordingly, after the clearance gap measurements are taken, the electromagnetic wave generator 140 may be electrically disconnected from the sensing arrays 122 and the engine 10 may be fired up without need to remove the sensing arrays 122. The degradable material may be selected depending on the stage in which the array is placed. For instance, low melting materials may be chosen for the compressors 22, 24 and medium or higher melting materials may be chosen for the turbines 28, 32.

Figure 6:
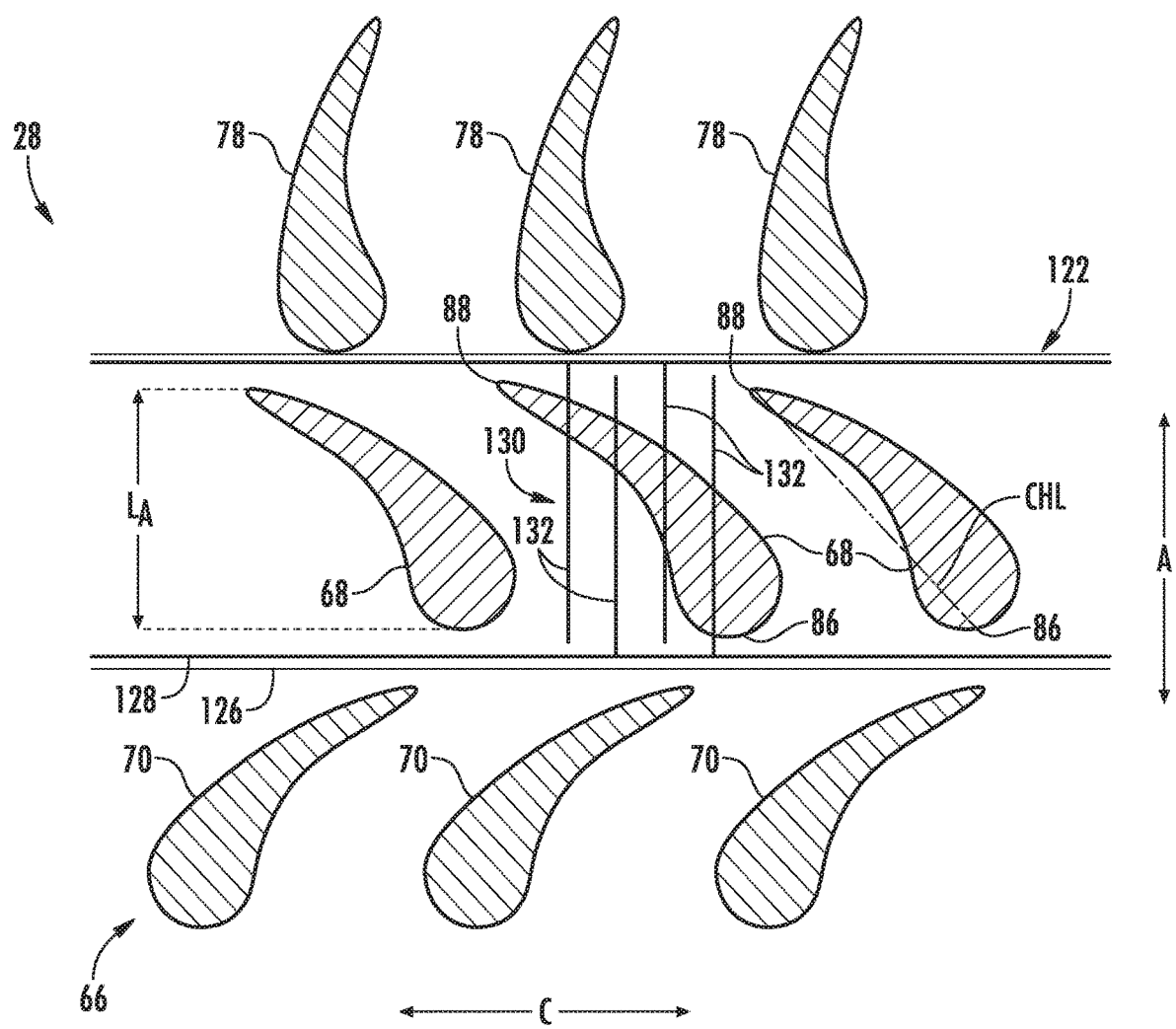
FIG. 6 provides a schematic view of the turbine of FIG. 2 depicting a sensing array configured to sense the clearance gap between a rotating turbine blade and a stationary component (not shown)

FIG. 6 provides a schematic view of the HP turbine 28 of FIG. 2 depicting one sensing array 122 configured for sensing the clearance gaps between the rotating turbine blades 68 and a stationary component (not shown in FIG. 6). The sensing array 122 is attached to the stationary component, e.g., a radially spaced casing. As shown in FIG. 6, HP turbine 28 includes nozzle vanes 70 of the turbine nozzles 66, the rotating turbine blades 68 downstream of the nozzle vanes 70, and the nozzle vanes 78 of the second stage nozzle segments. The sensing array 122 extends along the inner surface of the stationary component along the circumferential direction C and is also axially aligned with the array of turbine blades 68. Particularly, the sensing array 122 is attached to the stationary component such that the sensors 130 (only one shown in FIG. 6) are axially aligned with the turbine blades 68, which are the rotating components in this embodiment.

For this embodiment, the sensors 130 are configured to sense the clearance gap along the chord length of the turbine blades 68. As shown in the depicted embodiment of FIG. 6, each turbine blade 68 has an axial length $L_A$ extending between a leading edge 86 and a trailing edge 88 of the blade 68. The chord length of the blade 68 extends directly between the leading edge 86 and the trailing edge 88 of the blade 68. As shown, the sensor 130 spans a distance about equal to or greater than the axial length $L_A$ of the blade 68. In this way, the sensor 130 is configured to sense the clearance gap between a rotating and stationary component along the entire chord length of the rotating blade 68. Thus, any anomalous clearance gaps along the chord length of the blades 68 may be detected by the sensor 130 of the sensing array 122. Further, the specific location of the clearance anomaly may be detected by the sensor 130. In some embodiments, the plurality of sensors 130 of the sensing array 122 are each configured to sense the clearance gap between each rotating component and the stationary component along the respective chord lengths of the rotating blades 68. In some alternative embodiments, the digits 132 of the sensors 130 are angled with respect to the axial direction A such that they extend substantially parallel with the chord length CHL.

Returning to FIG. 4, as shown, the system 100 also includes computing system 150 that includes one or more computing devices 152 (one of which is shown in FIG. 4). In general, the computing device(s) 152 may correspond to any suitable processor-based device and/or any suitable combination of processor-based devices. Thus, in several embodiments, the computing device 152 may include one or more processor(s) 154 and associated memory device(s) 156 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 156 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 156 may generally be configured to store suitable computer-readable instructions that, when implemented by the processor(s) 154, configure or cause the computing device 152 to perform various functions including, but not limited to, receiving signals, processing the signals, and outputting clearance gap measurements.

The computing device(s) 152 of the computing system 150 may be communicatively coupled with the sensors 130 of the sensing arrays 120, 122, 124. For instance, the computing device 152 may be communicatively coupled with the sensors 130 via communication links or cables 158 and a plurality of connectors 164 positioned at or within the access ports 62, 64 or proximate inlet 52 of the gas turbine engine 10. The connectors 164 are electrically connectable with the sensing arrays 120, 122, 124 (e.g., via a suitable complementary connector or connecting plates printed on the flexible substrate 126). Thus, when the connectors 164 are connected to the sensing arrays 120, 122, 124, the computing device 152 is communicatively coupled with the sensors 130. In contrast, when the connectors 164 are disconnected from the sensing arrays 120, 122, 124, the computing device 152 is not communicatively coupled with the sensors 130. In this manner, the computing device 152 is selectively communicatively coupled with the sensors 130.

When the connectors 164 are connected with the sensing arrays 120, 122, 124, one or more signals (e.g., transmitted signals TS and reflected signals RS) may be routed from the sensors 130 to the computing device 152. Such signals may then be used to determine the clearance gaps between the rotating and stationary components of the gas turbine engine 10. Such calculated measurements may be displayed on a display device 160 to a user of the system 100. In this way, the clearance measurements may be viewed in real time. Additionally or alternatively, in some embodiments, the computing device 152 may route clearance gap measurements or related data acquired by the computing device 152 to a centralized data center 162 for subsequent storage and/or processing of the data. For example, the data center 162 may correspond to a remote server(s) or computing device(s) that is configured to communicate with the local computing device 152 via any suitable network, such as any suitable wired or wireless network(s) (e.g., a wide-area network (WAN)) that allows the computing device 152 and the data center 162 to communicate with one another via any suitable communications protocol (e.g. TCP/IP, HTTP, SMTP, FTP) and/or using any suitable encodings/formats (e.g. HTML, JSON XML) and/or protection schemes (e.g. VPN, secure HTTP, SSL). As a result, clearance gap measurements and related data acquired using the system 100 may be transmitted from a plurality of different assembly/maintenance sites or locations to a single centralized location. Accordingly, clearance gap profiles of certain engines may be developed and utilized to improve the assembly of turbine engines and ensure proper clearance gaps between rotating and stationary components.

In addition, as shown in FIG. 4, the computing device(s) 152 of the computing system 150 is communicatively coupled with the electromagnetic wave generator 140. As noted previously, the electromagnetic wave generator 140 may be a microwave generator, for example. The computing devices 152 may control operation of the microwave generator. For instance, the computing devices 152 may be used to activate the electromagnetic wave generator 140 during a clearance gap measurement process such that one or more electromagnetic waves EM (e.g., microwaves) are passed or transmitted to the sensors 130 when the connectors 164 are connected to the sensing arrays 120, 122, 124, e.g., when the connectors 164 are in electrical communication with the circuits 128 of the sensing arrays 120, 122, 124. The computing devices 152 may also control the frequency and amplitude of the electromagnetic waves EM generated by the electromagnetic wave generator 140. The computing devices 152 may also control the electromagnetic wave generator 140 to stop operation, e.g., after the clearance gap measurement process is completed.

Moreover, as further shown in FIG. 4, in some embodiments, the system 100 may include a rotating device 170 configured to rotate the rotating components of the gas turbine engine 10 about an axis of rotation, e.g., its centerline axis 12. In some embodiments, the rotating device 170 may correspond to an electric drive or motor that is operatively coupled to a drive shaft of the engine 10 (e.g., drive shaft 30 or drive shaft 34 shown in FIG. 1), either directly or indirectly via a gearbox or other rotational coupling. As such, by rotating the engine 10 via the rotating device 170, the various rotating components of the gas turbine engine 10 may be rotated about the axis of rotation of the engine, or centerline axis 12. In some embodiments, the computing device 152 may electronically control operation of the rotating device 170. For example, as shown in FIG. 4, the computing device 152 may be communicatively coupled to the rotating device 212 via a communicative link or cable 172. As such, the computing device 152 may be configured to transmit control signals to the rotating device 170 for controlling its operation. For instance, the computing device 152 may be configured to start/stop the rotating device 170 and/or control the operation of the rotating device 170 such that the engine 10 is rotated at a preselected controlled speed. Rotating the engine 10 at relatively slow and controlled speeds may facilitate more accurate clearance gap measurements. In alternative embodiments, the gas turbine engine 10 may be rotated by hand. Further, in some embodiments, the drive shaft 34 coupled to the fan rotor assembly 38 may be rotated about the centerline axis 12 so that the clearance gaps between the tips of the fan blades 44 and the inner surface of the fan casing 40 (FIG. 1) may be measured.

One exemplary manner in which the clearance gaps between associated rotating and stationary components of a turbomachine may be measured by the system 100 of FIG. 4 is provided below with reference to method (300).

Figure 7:
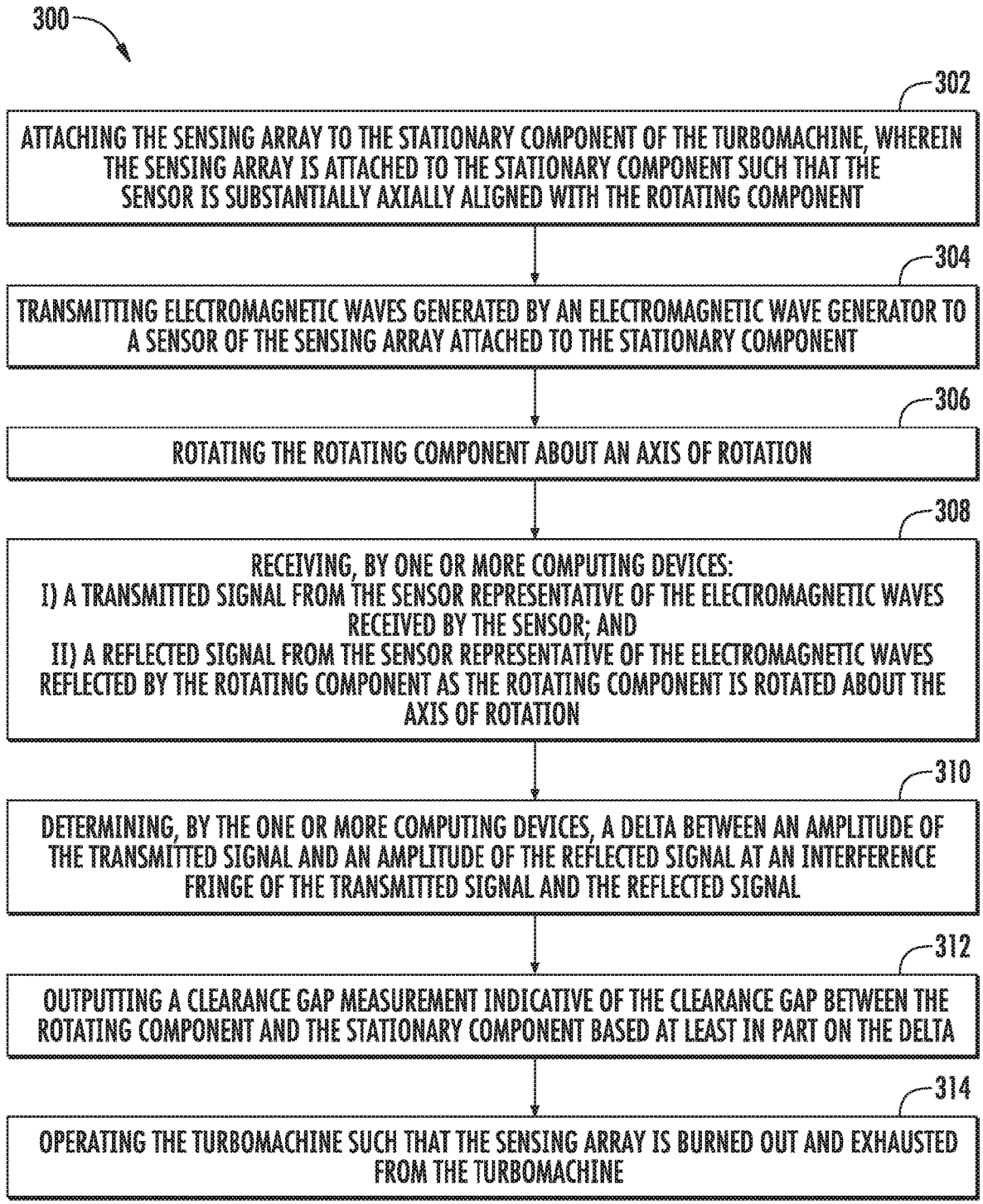
FIG. 7 provides a flow diagram for an exemplary method for measuring clearance gaps between rotatory and stationary components of a turbomachine in accordance with aspects of the present subject matter.

FIG. 7 provides a flow diagram of one embodiment of a method (300) for measuring a clearance gap between a rotating component and a stationary component of a turbomachine in accordance with exemplary aspects of the present subject matter. In general, the method (300) will be discussed herein with reference to the gas turbine engine 10 and the system 100 described above with reference to FIGS. 1-6. However, it should be appreciated by those of ordinary skill in the art that the disclosed method (300) may generally be implemented with turbomachines having other suitable configurations and/or with systems having other suitable system configurations.

At (302), in some implementations, the method (300) includes attaching a sensing array to a stationary component of the turbomachine. For instance, the sensing array may be the one of the sensing arrays 120, 122, 124 of FIG. 4. The sensing array may be attached to any suitable stationary component, such as e.g., a casing, a shroud, or some other stationary component spaced from the rotating component (e.g., radially spaced). In some implementations, as noted previously, the sensing array may be formed of flexible materials. In this way, the sensing array may be attached to a non-planar surface of a stationary component or components, e.g., the inner surface of a tubular casing. The sensing array may also be attached to a planar surface as well. Further, in some implementations, the sensing array is attached to the stationary component such that the sensor extends circumferentially around and is axially aligned with the rotating component. For instance, as shown in FIG. 6, the sensing array 122 is axially aligned with the rotating turbine blades 68 and extends circumferentially around the turbine blades 68. An additional example is provided below.

FIGS. 8 and 9 provide axial schematic views of the HP turbine 28 of FIG. 2 depicting one sensing array 122 positioned within the engine 10 (FIG. 1). As shown, the sensing array 122 is attached to the inner surface of the casing 18 (i.e., the stationary components) and extends along the circumferential direction C of the inner surface. Although not shown, the sensing array 122 may extend annually around the axis of rotation, which in this embodiment is the centerline axis 12 (FIG. 1). When the sensing array 122 is attached to the casing 18, the sensing array 122 is radially spaced from and axially aligned with the turbine blade 68 (i.e., the rotating components). Notably, the sensing array 122 may be attached to the casing 18 during assembly of the engine thus making access to the mounting surfaces of the stationary components readily accessible. The sensing array 122 may be attached to the casing 18 in any suitable manner. For instance, the sensing array 122 may be glued or otherwise adhered to the casing 18.

At (304), returning to FIG. 7, the method (300) includes transmitting electromagnetic waves generated by an electromagnetic wave generator to a sensor of a sensing array attached to the stationary component. For instance, the electromagnetic wave generator may be the electromagnetic wave generator 140 of FIG. 4. In some exemplary implementations, the electromagnetic wave generator 140 is a microwave generator configured to generate microwaves. In some implementations, the sensor is the sensor 130 of one of the exemplary sensing arrays 120, 122, 124 shown in FIG. 4. Moreover, in some implementations, the sensor is one of a plurality of sensors 130 of the sensing array. For instance, as shown in FIG. 4, the sensing arrays 120 include a plurality of sensors 130.

In one example implementation, as depicted in FIG. 4, the electromagnetic waves EM (e.g., microwaves) generated by the electromagnetic wave generator 140 are transmitted to the sensor 130 via communication link 158. The electromagnetic waves EM pass through the connectors 164 and feed into the interior of the gas turbine engine 10 through the access ports 62, 64 and inlet 52 to the circuits 128 of the respective sensing arrays 120, 122, 124. The electromagnetic waves EM are fed along the circuits 128 and to the sensors 130 of the sensing arrays 120, 122, 124. The interdigitated digits 132 or electrodes of the sensors 130 become excited by the electromagnetic waves EM. As will be explained below, the sensors 130 capture the electromagnetic waves EM and in turn output a transmitted signal TS that is representative of the frequency and amplitude of the received electromagnetic waves EM. Further, when the rotating component or components are rotated about, the sensors 130 may also output reflected signals RS.

At (306), the method (300) includes rotating the rotating component about an axis of rotation. For instance, as depicted in FIG. 4, the rotating component may be rotated about the centerline axis 12 of the gas turbine engine 10 by the rotating device 170. In some implementations, the computing device 152 may electronically control operation of the rotating device 170 to start/stop the rotating device 170 and/or control the operation of the rotating device 170 such that the engine 10 is rotated at a preselected controlled speed. Rotating the engine 10 at relatively slow and controlled speeds may facilitate more accurate clearance gap measurements. In alternative implementations, the gas turbine engine 10 may be rotated by hand.

By way of example, in some implementations, when the rotating components are rotated, e.g., by rotating device or by hand, the rotating components may be rotated about the axis of rotation. For example, as shown in FIG. 8, the rotating turbine blades 68 are positioned at a first rotation position in which the turbine blades 68 are radially aligned with the sensors 130 of the sensing array 122 at a first time T1. As shown in FIG. 9, after or as the blades are rotated, the rotating turbine blades 68 are positioned at a second rotation position in which the turbine blades 68 are not radially aligned with the sensors 130 of the sensing array 122 at a second time T2.

At (308), returning to FIG. 7, the method (300) includes receiving, by one or more computing devices: i) a transmitted signal from the sensor representative of the electromagnetic waves received by the sensor; and ii) a reflected signal from the sensor representative of the electromagnetic waves reflected by the rotating component as the rotating component is rotated about the axis of rotation. For instance, with reference to FIG. 4, the one or more computing devices 152 of the computing system 150 may receive transmitted signal TS and reflected signal RS from the sensor 130, or each sensor 130 of the system 100. The sensor 130 may transmit the transmitted and reflected signals TS, RS to the computing devices 152 via the circuit 128 of the sensing array 120 of the sensor 130, through the connectors 164, and along the communication link 158 to the computing device 152.

Figure 10:
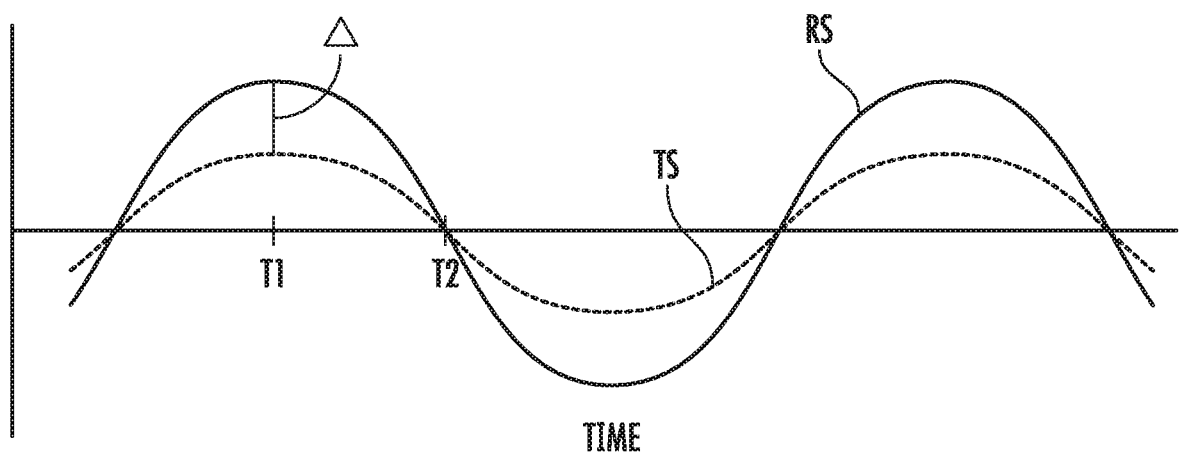
FIG. 10 provides a graph depicting a transmitted signal and a reflected signal as a function of time in accordance with aspects of the present subject matter.

With reference now to FIGS. 8, 9, and 10, FIG. 10 provides a graph depicting the transmitted signal TS and the reflected signal RS as a function of time in accordance with aspects of the present subject matter. As the turbine blades 68 are rotated about the axis of rotation, e.g., from the first rotation position at the first time T1 as shown in FIG. 8 to the second rotation position at the second time T2, the amount the rotating blades 68 reflect the transmitted signals TS varies. For instance, when the blades 68 are radially aligned with the sensors 130 as shown in FIG. 8, the transmitted signal TS will be reflected by the blades 68 to a greater degree than when the blades 68 are not radially aligned with the sensors 130 as shown in FIG. 9. Accordingly, the amplitude of the reflected signals RS transmitted by the sensors 130 are greatest when the blades 68 are radially aligned with the sensors 130 (e.g., FIG. 8) and are the lowest when the blades 68 are positioned circumferentially between the sensors 130 (e.g., FIG. 9). The transmitted and reflected signals TS, RS captured and output by one of the sensors 130 is shown in FIG. 10. As depicted, the signals are shown at first time T1 and second time T2 that correspond with the rotational positions of the blades 68 in FIGS. 8 and 9, respectively.

At (310), with reference again to FIG. 7, the method (300) includes determining, by the one or more computing devices, a delta between an amplitude of the transmitted signal and an amplitude of the reflected signal at an interference fringe of the transmitted signal and the reflected signal. Accordingly, for this example, the signal differentiator used to compare the signals is the reflection of the transmitted signal, represented by the reflected signal RS. In such implementations, for example, the amplitude of the reflected signal RS may be compared to the amplitude of the transmitted signal TS at a constructive interference of the signals, or more broadly, and interference fringe. As shown in FIG. 10, an interference fringe, which in this example is a constructive interference of the signals occurs at the first time T1, which corresponds with the blades 68 rotated to the first blade position as shown in FIG. 8. As depicted, a delta A between the amplitudes of the two signals is taken at the interference fringe, which occurs at the first time T1. Notably, the delta A is indicative of the clearance gap between the rotating component and the stationary component. The one or more computing devices 152 of computing system 150 may determine the delta.

At (312), the method (300) includes outputting a clearance gap measurement indicative of the clearance gap between the rotating component and the stationary component based at least in part on the delta. For instance, after calculating the delta at (310), the one or more computing devices 152 of computing system 150 may correlate the delta A with an associated clearance gap. As one example, the one or more computing devices 152 may include a database that associates deltas with clearance gaps. After correlating the determined delta with an associated clearance gap, the one or more computing devices 152 output the clearance gap measurement. For example, the clearance gap measurement may be outputted to display device 160 such that the clearance gap measurements may be displayed in real time, to centralized data center 162 for further analysis and data storage, a combination thereof, or to other desired recipients. In some implementations, the delta determined at (310) may be output as the clearance gap measurement. Further, it will be appreciated that the delta between the transmitted and reflected signals TS, RS for each sensor of each array may be calculated and output at (312). In this way, a clearance gap profile of the engine may be rendered, e.g., in real time.

At (314), in some implementations, the turbomachine is a turbine engine and the sensing array is formed of a degradable material. In such implementations, the method (300) includes operating the turbine engine such that the sensing array is burned out and exhausted from the turbine engine. For example, with reference to FIG. 4, after outputting the clearance gap measurements at (312), the sensing arrays 120, 122, 124 may be electrically disconnected from their associated connectors 164. Thereafter, the turbomachine, or gas turbine engine 10, in this implementation is "fired up" or operated to burn out the sensing arrays 120, 122, 124, e.g., such that they are consumed by the combustion gases. In some embodiments, the sensing arrays formed of degradable material are consumed without leaving an undesirable residue in the gas turbine engine 10. For instance, the degradable material of the sensing arrays may burn out as carbon soot or some other non-harmful byproduct, as noted previously. In this manner, after the clearance gap measurements are output at (314), the engine 10 may be fired up without need to remove the sensing arrays. This may, for example, improve the efficiency of the process as there is no need to remove delicate instruments or wires from the engine 10.

Further, in some exemplary embodiments and implementations, the sensing arrays having a plurality of sensors may be attached to the rotating components instead of the one or more stationary components. Clearance gap measurements may be determined in the manner described above even with the sensors attached to the rotating components. One example manner in which a sensing array may be attached to rotating components is provided below.

Figure 11:
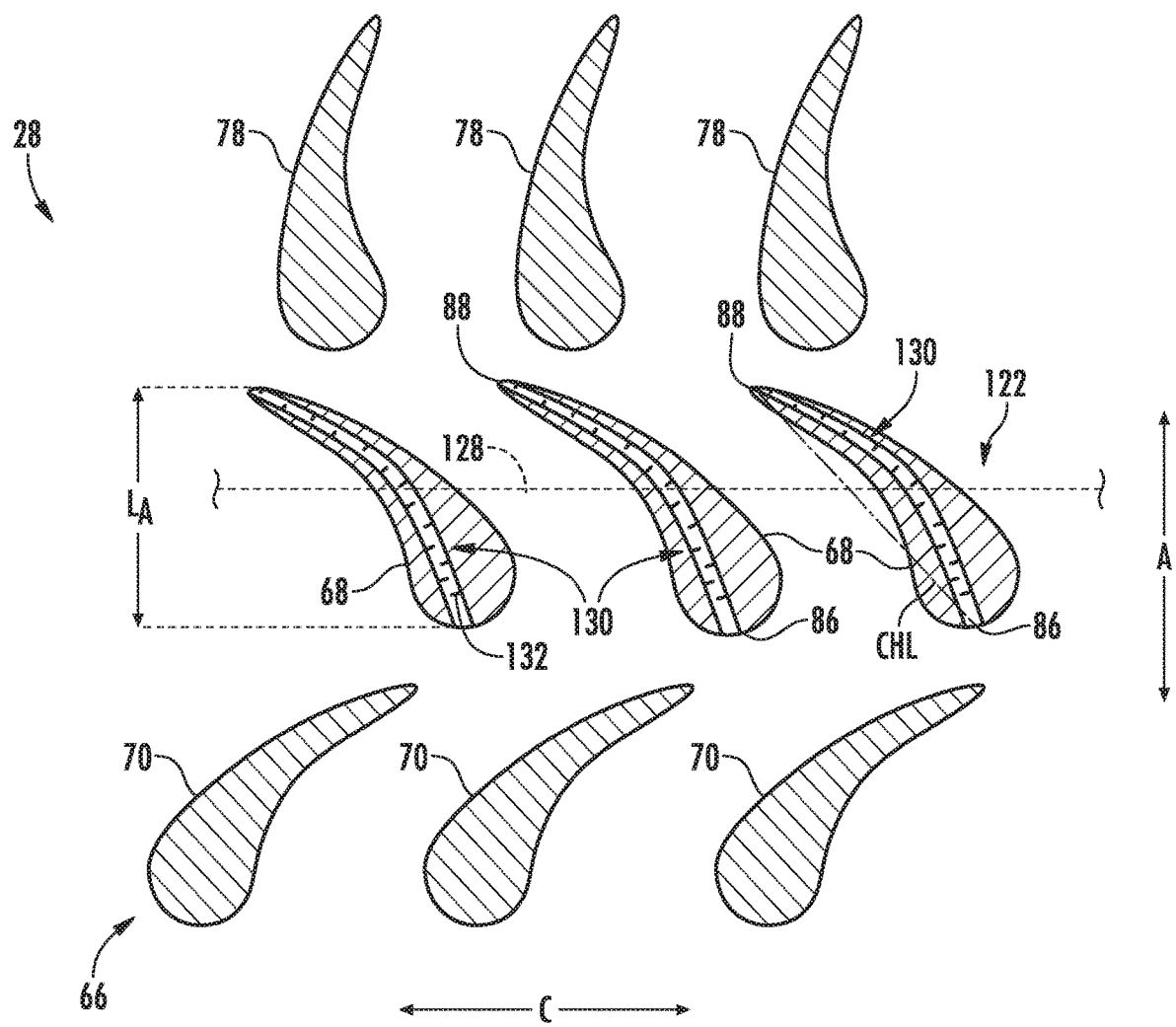
FIG. 11 provides a schematic view of the turbine of FIG. 2 depicting a sensing array configured to sense the clearance gap between a rotating turbine blade and a stationary component (not shown), wherein the sensing array is attached to the rotating turbine blades.

FIG. 11 provides a schematic view of the HP turbine 28 of FIG. 2 depicting one sensing array 122 configured for sensing the clearance gaps between the rotating turbine blades 68 and a stationary component (not shown in FIG. 11). As shown in FIG. 11, the sensing array 122 is attached to the rotating turbine blades 68 and the sensors 130 are positioned along the chord length CHL of each blade 68. The sensors 130 are electrically connected with one another via the flexible circuit 128 (shown in dashed lines in FIG. 11). The curvature of each sensor 130 is complementary to the curvature of the blade 68 to which they are attached. In this way, the sensors 130 are configured to sense the clearance gap between the rotating blades 68 and stationary component (e.g., a casing) along the entire chord length of the rotating blade 68. Thus, any anomalous clearance gaps along the chord length of the blades 68 may be detected by the sensor 130 of the sensing array 122. Further, the specific location of the clearance anomaly may be detected by the sensors 130. As noted above, the sensors 130 may generate an output indicative of a clearance gap measurement of the clearance gap between the rotating blades 68 and the stationary component in a manner described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
   a turbomachine comprising a rotating component rotatable about an axis of rotation and a stationary component spaced from the rotating component by a clearance gap;
   a sensor attached to one of the stationary component and the rotating component;
   an electromagnetic wave generator in electrical communication with the sensor and configured to generate electromagnetic waves; and
   a computing device communicatively coupled with the sensor, the computing device configured to:
      receive a transmitted signal from the sensor, wherein the transmitted signal is representative of the electromagnetic waves received by the sensor;
      receive, as the rotating component is rotated about the axis of rotation, a reflected signal from the sensor, wherein the reflected signal is representative of the electromagnetic waves reflected by the rotating component;
      determine a delta between an amplitude of the transmitted signal and an amplitude of the reflected signal of the transmitted signal and the reflected signal; and
      output a clearance gap measurement indicative of the clearance gap between the rotating component and the stationary component based at least in part on the delta,
      wherein the sensor is formed of a degradable material such that the sensor is consumed upon operation of the turbomachine.

2. The system of claim 1, wherein the sensor is formed of a flexible material.

3. The system of claim 1, wherein the sensor is one of a plurality of sensors of a sensing array attached to the stationary component and the rotating component is one of a plurality of rotating components spaced from the stationary component by a clearance gap, and wherein the computing device is further configured to:
   receive a transmitted signal from each of the plurality of sensors, wherein the transmitted signals are representative of the electromagnetic waves received by the plurality of sensors;
   receive, as the plurality of rotating components are rotated about the axis of rotation, a reflected signal from each of the plurality of sensors, wherein the reflected signals are representative of the electromagnetic waves reflected by the plurality of rotating components;
   determine, for each of the plurality of sensors, a delta between an amplitude of the transmitted signal and an amplitude of the reflected signal at an interference fringe of the transmitted signal and the reflected signal; and
   output, for each of the clearance gaps, a clearance gap measurement based at least in part on the deltas.

4. The system of claim 3, wherein the sensing array comprises a flexible circuit that electrically connects the plurality of sensors, and wherein the flexible circuit is formed of a flexible material.

5. The system of claim 3, further comprising:
   a connector electrically connectable with the sensing array and in electrical communication with the electromagnetic wave generator, wherein when the connector is electrically connected with the sensing array, the electromagnetic wave generator and the sensing array are in electrical communication.

6. The system of claim 3, wherein each of the plurality of sensors have a plurality of digits that are interdigitated and spaced from one another along the stationary component.

7. The system of claim 1, wherein the electromagnetic wave generator is a microwave generator and the electromagnetic waves are microwaves.

8. The system of claim 1, wherein the computing device is configured to determine the delta between an amplitude of the transmitted signal and an amplitude of the reflected signal at an interference fringe of the transmitted signal and the reflected signal.

9. The system of claim 1, wherein the turbomachine is a turbine engine and the rotating component is a blade and the stationary component is one of a casing and a shroud radially spaced from the blade.

10. The system of claim 1, further comprising:
    a rotating device operatively coupled with the turbomachine and configured to rotate the rotating component of the turbomachine about the axis of rotation at a preselected controlled speed.

11. The system of claim 1, wherein the rotating component is a blade having an axial length extending between a leading edge and a trailing edge of the blade, and wherein the sensor spans a distance about equal to or greater than the axial length of the blade.

12. A method for measuring a clearance gap between a rotating component and a stationary component of a turbomachine, the method comprising:
    transmitting electromagnetic waves generated by an electromagnetic wave generator to a sensor of a sensing array attached to one of the stationary component and the rotating component;
    rotating the rotating component about an axis of rotation;
    receiving, by one or more computing devices:
       i) a transmitted signal representative of the electromagnetic waves received by the sensor; and
       ii) a reflected signal representative of the electromagnetic waves reflected by the rotating component as the rotating component is rotated about the axis of rotation; determining, by the one or more computing devices, a delta between an amplitude of the transmitted signal and an amplitude of the reflected signal at an interference fringe of the transmitted signal and the reflected signal; and
    outputting a clearance gap measurement indicative of the clearance gap between the rotating component and the stationary component based at least in part on the delta,
    wherein the sensing array is formed of a degradable material, and
    wherein the method further comprises:
    operating the turbomachine such that the sensing array is burned out and exhausted from the turbomachine.

13. The method of claim 12, further comprising:
    attaching the sensing array to the stationary component of the turbomachine, wherein the sensing array is attached to the stationary component such that the sensor is substantially axially aligned with the rotating component.

14. The method of claim 12, wherein the turbomachine is a turbine engine.

15. The method of claim 12, wherein the sensor is one of a plurality of microwave sensors of the sensing array.

16. The method of claim 12, wherein the sensor comprises a plurality of interdigitated digits.

17. A system, comprising:
a turbine engine comprising an array of rotating blades rotatable about an axis of rotation and one or more stationary components radially spaced from the rotating blades of the array, wherein each of the rotating blades is spaced from the one or more stationary components by a clearance gap;
a sensing array attached to the one or more stationary components, the sensing array comprising a flexible circuit extending circumferentially along the one or more stationary components and a plurality of sensors electrically coupled by the flexible circuit and spaced circumferentially from one another, wherein the sensing array is formed of a flexible and degradable material such that the sensing array is consumed upon operation of the turbine engine;
a microwave generator in electrical communication with the sensing array; and
a computing device communicatively coupled with the sensing array, the computing device configured to:
  activate the microwave generator to generate microwaves, wherein the plurality of sensors receive the microwaves;
  receive a transmitted signal from each of the plurality of sensors, wherein the transmitted signal received from each of the plurality of sensors is representative of the microwaves received by the plurality of sensors;
  receive, as the rotating blades are rotated about the axis of rotation, a reflected signal from each of the plurality of sensors, wherein the reflected signal received from each of the plurality of sensors is representative of the microwaves reflected by the rotating blades as the rotating blades are rotated about the axis of rotation;
  compare the transmitted signal and the reflected signal associated with the transmitted signal for each of the plurality of sensors based at least in part on one or more signal differentiators; and
  output a clearance gap measurement for each of the clearance gaps between the rotating blades and the one or more stationary components based at least in part on the comparison between the transmitted signal and the reflected signal associated with the transmitted signal for each of the plurality of sensors based on the one or more signal differentiators.

18. The system of claim 17, wherein the signal differentiator is one of a frequency change, an attenuation, a reflection of the transmitted signal, and a phase shift between the transmitted signal and the reflected signal.

19. The system of claim 17, wherein the array of rotating blades is one of a plurality of arrays of rotating blades rotatable about the axis of rotation, and wherein each of the plurality of arrays of rotating blades has one more stationary components radially spaced therefrom by a clearance gap, and wherein the sensing array is one of a plurality of sensing arrays, and wherein each array of the plurality of arrays of rotating blades has an associated one of the plurality of sensing arrays.

20. The system of claim 17, wherein the plurality of sensors of the sensing array are configured to sense the clearance gap along a chord length of at least one rotating blade of the array of rotating blades.

* * * * *